United States Patent
Katzourakis et al.

(10) Patent No.: US 10,384,672 B1
(45) Date of Patent: Aug. 20, 2019

(54) VEHICLE STABILITY CONTROL SYSTEM

(71) Applicants: Diomidis Katzourakis, Chania (GR); Huibert Mees, Pleasanton, CA (US); Christopher D. Gadda, Sunnyvale, CA (US); Stefan Solyom, Sunnyvale, CA (US); Johannes A. Huennekens, San Jose, CA (US)

(72) Inventors: Diomidis Katzourakis, Chania (GR); Huibert Mees, Pleasanton, CA (US); Christopher D. Gadda, Sunnyvale, CA (US); Stefan Solyom, Sunnyvale, CA (US); Johannes A. Huennekens, San Jose, CA (US)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 15/592,440

(22) Filed: May 11, 2017

Related U.S. Application Data

(60) Provisional application No. 62/334,725, filed on May 11, 2016.

(51) Int. Cl.
| | |
|---|---|
| *B60W 30/04* | (2006.01) |
| *B60W 40/112* | (2012.01) |
| *B60W 40/114* | (2012.01) |
| *B60W 10/04* | (2006.01) |
| *B60W 10/18* | (2012.01) |

(Continued)

(52) U.S. Cl.
CPC .......... *B60W 30/04* (2013.01); *B60W 10/04* (2013.01); *B60W 10/18* (2013.01); *B60W 10/20* (2013.01); *B60W 10/22* (2013.01); *B60W 40/112* (2013.01); *B60W 40/114* (2013.01); *B60W 2030/043* (2013.01); *B60W 2540/18* (2013.01); *B60W 2710/18* (2013.01); *B60W 2710/20* (2013.01); *B60W 2710/22* (2013.01)

(58) Field of Classification Search
CPC ...... B60W 30/04; B60W 10/04; B60W 10/18; B60W 10/20; B60W 10/22; B60W 40/112; B60W 40/114; B60W 2030/043; B60W 2540/18; B60W 2710/18; B60W 2710/20; B60W 2710/22
USPC .......................................................... 701/37
See application file for complete search history.

(56) References Cited

U.S. PATENT DOCUMENTS

| | | | | |
|---|---|---|---|---|
| 5,648,903 | A | * | 7/1997 | Liubakka ................ B60T 8/175 180/197 |
| 5,747,683 | A | * | 5/1998 | Gerum .................. B60T 8/1708 701/72 |

(Continued)

*Primary Examiner* — Tuan C To
(74) *Attorney, Agent, or Firm* — Young Basile Hanlon & MacFarlane, P.C.

(57) ABSTRACT

A control system for a vehicle includes an internal vehicle reference model that determines reference states for the vehicle that represent an expected vehicle response, sensors that determine measured states for the vehicle, and a vehicle motion control system that determines desired states for the vehicle. A stability determining module identifies a reference deviation between the reference states and the measured states, identifies a desired deviation between the desired states and measured states, and outputs a command for reducing the reference deviation and the desired deviation. Actuators are operable to reduce the reference deviation and the desired deviation in response to the command.

20 Claims, 6 Drawing Sheets

(51) Int. Cl.
*B60W 10/20* (2006.01)
*B60W 10/22* (2006.01)

(56) References Cited

U.S. PATENT DOCUMENTS

| | | | |
|---|---|---|---|
| 5,754,966 A * | 5/1998 | Ichikawa | B62D 7/159 180/410 |
| 5,774,821 A * | 6/1998 | Eckert | B60T 8/1755 303/140 |
| 6,195,606 B1 * | 2/2001 | Barta | B60T 8/17552 303/140 |
| 6,547,343 B1 * | 4/2003 | Hac | B60T 8/1755 303/140 |
| 6,615,124 B1 * | 9/2003 | Adachi | B60T 8/1755 180/410 |
| 8,285,444 B2 | 10/2012 | Lee et al. | |
| 8,340,881 B2 | 12/2012 | O'Dea et al. | |
| 8,718,868 B2 | 5/2014 | Petrucci et al. | |
| 8,989,949 B2 | 3/2015 | Lohberg et al. | |
| 2002/0026268 A1 | 2/2002 | Millsap et al. | |
| 2006/0276944 A1 * | 12/2006 | Yasui | B60T 8/172 701/37 |
| 2008/0040000 A1 * | 2/2008 | Chen | B60G 17/0152 701/38 |
| 2008/0284574 A1 * | 11/2008 | Bosch | B60G 17/019 340/438 |
| 2009/0030561 A1 | 1/2009 | Gurieff et al. | |
| 2009/0306856 A1 * | 12/2009 | Fritz | B60T 8/1755 701/42 |
| 2010/0299018 A1 | 11/2010 | Lohberg et al. | |
| 2011/0054738 A1 * | 3/2011 | Savaresi | B60T 8/1755 701/41 |
| 2012/0109458 A1 | 5/2012 | Sidlosky | |
| 2012/0150408 A1 * | 6/2012 | Takenaka | B62K 1/00 701/70 |
| 2012/0173108 A1 * | 7/2012 | Takenaka | B62J 25/00 701/70 |
| 2013/0062930 A1 * | 3/2013 | Muntu | B60T 8/17555 303/3 |
| 2013/0103259 A1 | 4/2013 | Eng et al. | |
| 2014/0046539 A1 | 2/2014 | Wijffels et al. | |
| 2015/0217766 A1 * | 8/2015 | Kelly | F16H 61/0213 701/94 |
| 2015/0217767 A1 * | 8/2015 | Kelly | B60K 28/16 701/93 |
| 2016/0016581 A1 * | 1/2016 | Yokota | B60W 10/04 701/41 |
| 2016/0375901 A1 * | 12/2016 | Di Cairano | B60W 30/09 701/26 |

* cited by examiner

VEHICLE STABILITY CONTROL SYSTEM

CROSS-REFERENCE TO RELATED APPLICATIONS

This application claims the benefit of U.S. Provisional Application No. 62/334,725, filed on May 11, 2016, which is incorporated herein by reference in its entirety.

TECHNICAL FIELD

The application relates generally to vehicle stability control.

BACKGROUND

In the field of vehicle control, stability refers to the ability of a vehicle to maintain its intended course. Under certain circumstances, a vehicle may become unstable, meaning that the vehicle deviates from its intended course and/or is no longer able to maintain body (longitudinal, lateral, yaw, roll) control. Loss of stability may be caused by forces associated with cornering and accelerating-braking. The ability of the vehicle to maintain stability is in part a function of the friction available at the surface on which the vehicle is travelling. For example, braking and cornering require more available friction than straight line driving at constant speed, and the vehicle may become unstable when the friction required by a cornering or braking maneuver exceeds the available friction.

Electronic stability control systems are intended to detect and reduce loss of directional stability. Conventional electronic stability control systems determine a steering direction by measuring the steering wheel angle, and estimate the vehicle's intended course based on the vehicle states, such as, lateral acceleration, yaw, and road wheel speeds. The electronic stability control system may determine that the vehicle has lost stability based on a deviation of the vehicle's actual measured states, such as yaw rate direction from the estimated intended course. Upon determining that the vehicle has lost stability, the electronic stability control system can apply braking at the road wheels individually and/or request propulsion torque to regain stability. For example, braking may be applied to the outer front wheel to counter oversteer or braking may be applied to the inner rear wheel to counter understeer.

SUMMARY

One aspect of the disclosure is a control system for a vehicle. The control system has an internal vehicle reference model that determines reference states for the vehicle that represent an expected vehicle response. Sensors determine measured states for the vehicle. A stability determining module identifies a reference deviation between the reference states and the measured states and outputs a command for reducing the deviation. Actuators are operable to reduce the deviation in response to the command.

Another aspect of the disclosure is a control system for a vehicle. The control system includes a vehicle motion control system that determines a desired path for the vehicle and outputs a braking command based on the desired path, and a stability control system. The stability control system is operable to determine reference states that represent an expected vehicle response to execution of the braking commands, determine measured states that represent an actual vehicle response to execution of the braking command, determine a reference deviation based on a difference between the reference states and the measured states, and output a braking intervention command that for applying braking to reduce the reference deviation. The control system also includes a braking system that applies braking in response to the braking command and the braking intervention command.

Another aspect of the disclosure is a control system for a vehicle. The control system includes a stability control system that is operable to determine reference states that represent an expected vehicle response, determine measured states that represent an actual vehicle response, identify an unstable condition based on a difference between the reference states and the measured states, determine a stability intervention to reduce the difference between the reference states and the measured states, the stability intervention having a first component and a second component, output a braking intervention command to satisfy the first component of the stability intervention, and output a supplemental intervention command to satisfy the second component of the stability intervention. A braking system applies braking in response to the braking intervention command. A vehicle motion control system causes operation of an additional actuator system to reduce the difference between the reference states and the measured states in response to the supplemental intervention command from the stability control system.

DETAILED DESCRIPTION

When a vehicle loses stability, rotation of the vehicle around its Z axis (yawing) and/or excessive sideslip and/or excessive roll angle may be induced such that a steering angle of the vehicle does not match the intended direction of the vehicle. In this situation, controlling the vehicle to restore stability based on the steering angle of the vehicle may result in the vehicle regaining stability but being oriented in a direction that deviates greatly from an intended direction of travel. In the systems and methods described herein, information from various vehicle control systems, such as suspension components, steering components, braking components, and propulsion components is utilized in combination with knowledge of an intended path that the vehicle should follow to restore stability to the vehicle and allow the vehicle to return to following the intended path.

As an example, the stability control systems described herein may be implemented in vehicles that are operated in autonomous and semi-autonomous modes, and in which a vehicle motion control system uses environment sensors to determine a desired path and a desired vehicle response over that path. The vehicle is controlled, in part, based on kinematic states that describe how the vehicle is moving. The kinematic states include, for example, 3-axis translation and rotation rates and accelerations. The desired path and desired vehicle response are utilized to determine desired states, and the actuators of the vehicle are controlled to cause the actual motion of the vehicle, as described by measured states, to match the desired states.

The stability control system includes an internal vehicle reference model that determines reference states for the vehicle that represent an expected vehicle response. The reference vehicle response should not deviate from the measured vehicle response by more than a threshold amount as long as the environment variables have been assumed correctly, such as the road friction coefficient. The reference vehicle response is also bound to vehicle motion-response constraints. The vehicle should not deviate from the motion constraints by more than a threshold amount. The motion constraints may include an excessive vehicle body sideslip angle. Sensors determine the measured states for the vehicle. A stability determining module identifies a reference deviation between the reference states and the measured states and outputs a command, while taking into consideration the desired vehicle response from the vehicle motion control system. Actuators are operable to reduce the deviations in the reference and desired states relative to the measured states in response to the command. Thus when the stability control system intervenes, the final vehicle response will conform to the desired states that were determined by the vehicle motion control module.

Figure 1:
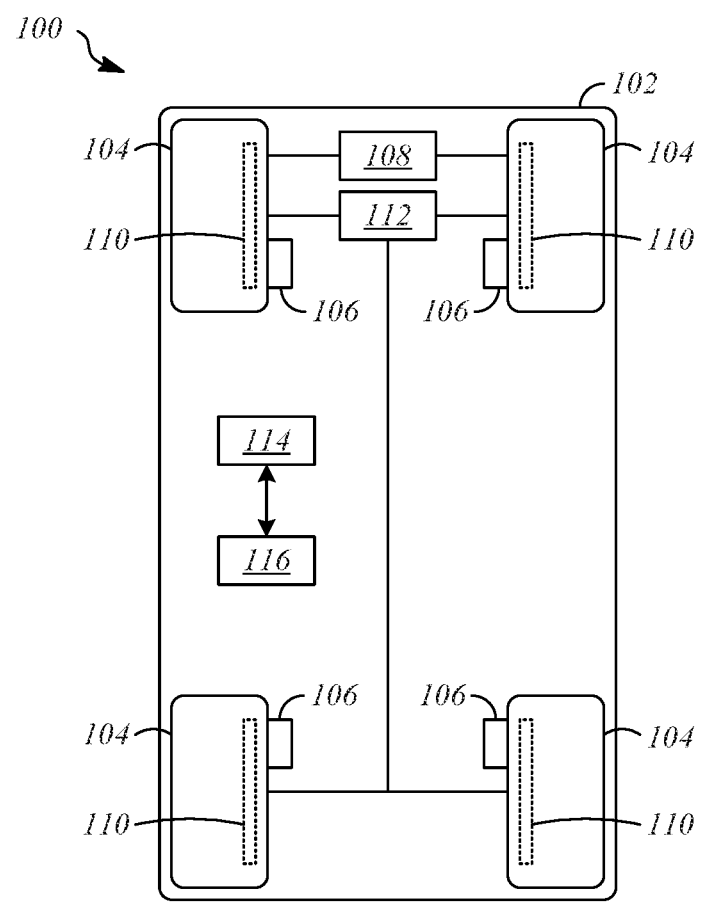
FIG. 1 is an illustration showing a vehicle.

FIG. 1 shows a vehicle 100 that has a vehicle body 102. The vehicle body 102 may include internal structural portions and external portions that are aesthetic and/or structural in nature. As examples, the vehicle body 102 may include one or more of a unibody, a frame, a subframe, a monocoque, and body panels.

The vehicle 100 includes road wheels 104. Four of the road wheels 104 are included in the illustrated example, but other implementations are possible. The road wheels 104 are the portion of the vehicle 100 that contacts the surface on which the vehicle 100 is travelling, and the characteristics of the road wheels 104 are responsible, in part, for the amount of friction available. The road wheels 104 may include tires, such as conventional pneumatic tires formed in part from synthetic rubber, or other friction-enhancing structures may be incorporated in the road wheels 104.

The vehicle 100 includes suspension components 106. The suspension components 106 typically include numerous individual components, many of which are associated with one or more of the road wheels 104. The suspension components 106 may include components that are operable to control characteristics of the motion of the road wheels 104 relative to the vehicle body 102, such as shocks, struts, springs, and sway bars. The suspension components 106 may include either or both of non-adjustable passive components or adjustable active components that allow modification of suspension characteristics during operation of the vehicle 100. The suspension components 106 may include sensors that output signals indicative of the states and operating characteristics of some or all of the suspension components 106 at a given time. The suspension components 106 may also include actuators that are able to cause modification of characteristics of the components of the suspension components 106 in response to control signals.

The vehicle 100 includes steering components 108. The steering components 108 are operable to modify a steering angle of some or all of the road wheels 104 relative to the vehicle body 102. As one example, the steering components 108 may be or include a conventional rack and pinion arrangement. In some implementations, the steering components 108 are operable to control the steering angles of the road wheels 104 independently. The steering components 108 may include one or more sensors to output signals indicative of the steering angles of the road wheels 104. The steering components 108 may include actuators operable to cause adjustment of the steering angles of the road wheels 104 in response to control signals.

The vehicle 100 includes braking components 110. The braking components 110 include components that are operable to slow the speeds of the road wheels 104, such as conventional disk brakes. Other types of components may be utilized to slow the speeds of the road wheels. The braking components 110 also include components that cause and control application of braking forces. These components may include, as examples, a brake control module, a master cylinder, and a brake booster. The braking components 110 are operable to apply braking to each of the road wheels 104 individually. The braking components 110 include sensors that output signals that are indicative of the current operating characteristics of the braking components 110. The braking components 110 may also include actuators that are operable to cause and control application of braking forces in response to control signals.

The vehicle 100 includes propulsion components 112, which may also be referred to as a powertrain. The propulsion components 112 include a prime mover that is operable to convert stored energy into driving force, and components that are operable to supply this force to some or all of the road wheels 104 in order to propel the vehicle 100. As one example, the propulsion components 112 may include an internal combustion engine that burns liquid fuel. As another example, the propulsion components 112 may include an electric motor that utilizes electrical energy that is stored in batteries or supplied by a generator.

The vehicle 100 includes an electronic control unit 114. Although the electronic control unit 114 is shown and described as a single electronic control unit, the same functions may be implemented using multiple electronic control units, such as individual electronic control units associated with each of the various components of the vehicle 100. The electronic control unit 114 may be in electrical communication with components including the suspension components 106, the steering components 108, the braking components 110, and the propulsion components 112 to transmit commands to the components and/or to receive information from the components. The electronic control unit 114 may include a memory and a processor that is operable to execute instructions that are stored in the memory in order to perform operations as will be described herein.

The vehicle 100 also includes sensors 116 that are in communication with the electronic control unit 114. The sensors 116 monitor and report information regarding operating characteristics of the vehicle 100. Some of the sensors 116 may be incorporated in the suspension components 106, the steering components 108, the braking components 110, and the propulsion components 112.

Figure 2:
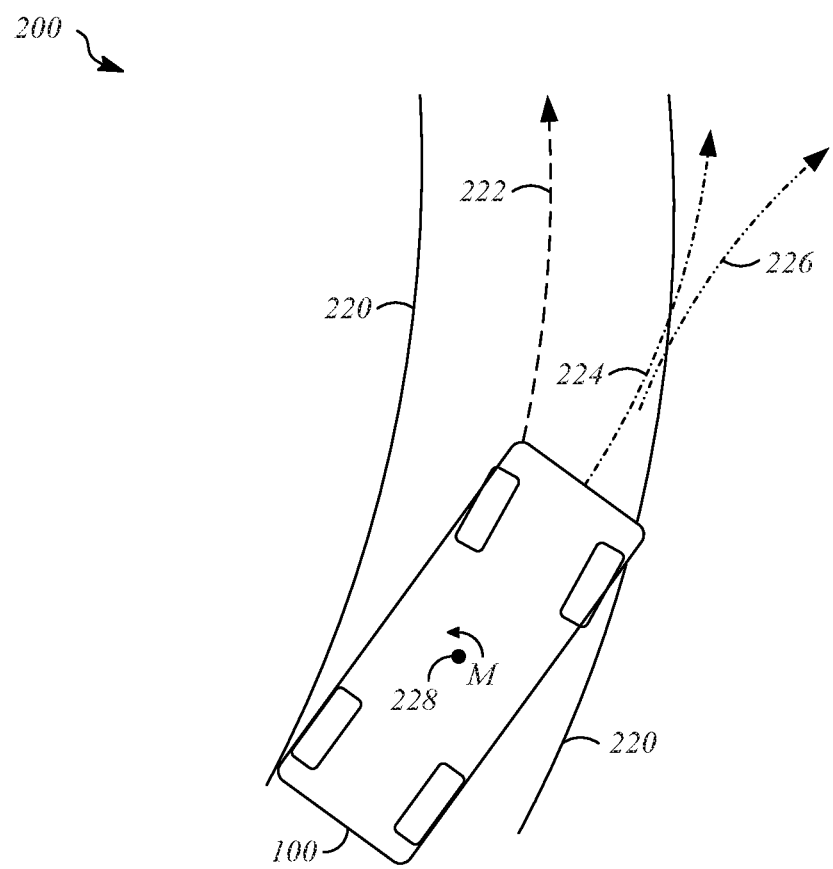
FIG. 2 is an illustration showing the vehicle traversing a roadway.

FIG. 2 shows the vehicle 100 traversing a roadway 200. The roadway 200 includes boundaries 220. As examples, the boundaries 220 could be physical boundaries such as an edge of pavement or a barrier such as a curb, or the boundaries 220 could be marked boundaries such as pavement marking lines that indicate the extents of a lane.

A desired path 222 represents the path the vehicle 100 is intended to travel, and may extend from a start point, such as the vehicle 100 itself, to an end point, such as a waypoint along a route. As used herein, the term "path" refers to a trajectory for the vehicle 100 and may also include a velocity profile. A reference path 224 represents a path that the vehicle 100 is expected to travel along based on the current states of various systems and components of the vehicle 100, and thus is the vehicle response that is expected given the current states of the various systems and components. A measured path 226 represents a path that the vehicle 100 is actually travelling along, as observed using measurements from sensors, such as the sensors 116. A yaw moment M represents a moment acting on the vehicle 100 at a center of rotation 228, to cause rotation of the vehicle 100.

Figure 3:
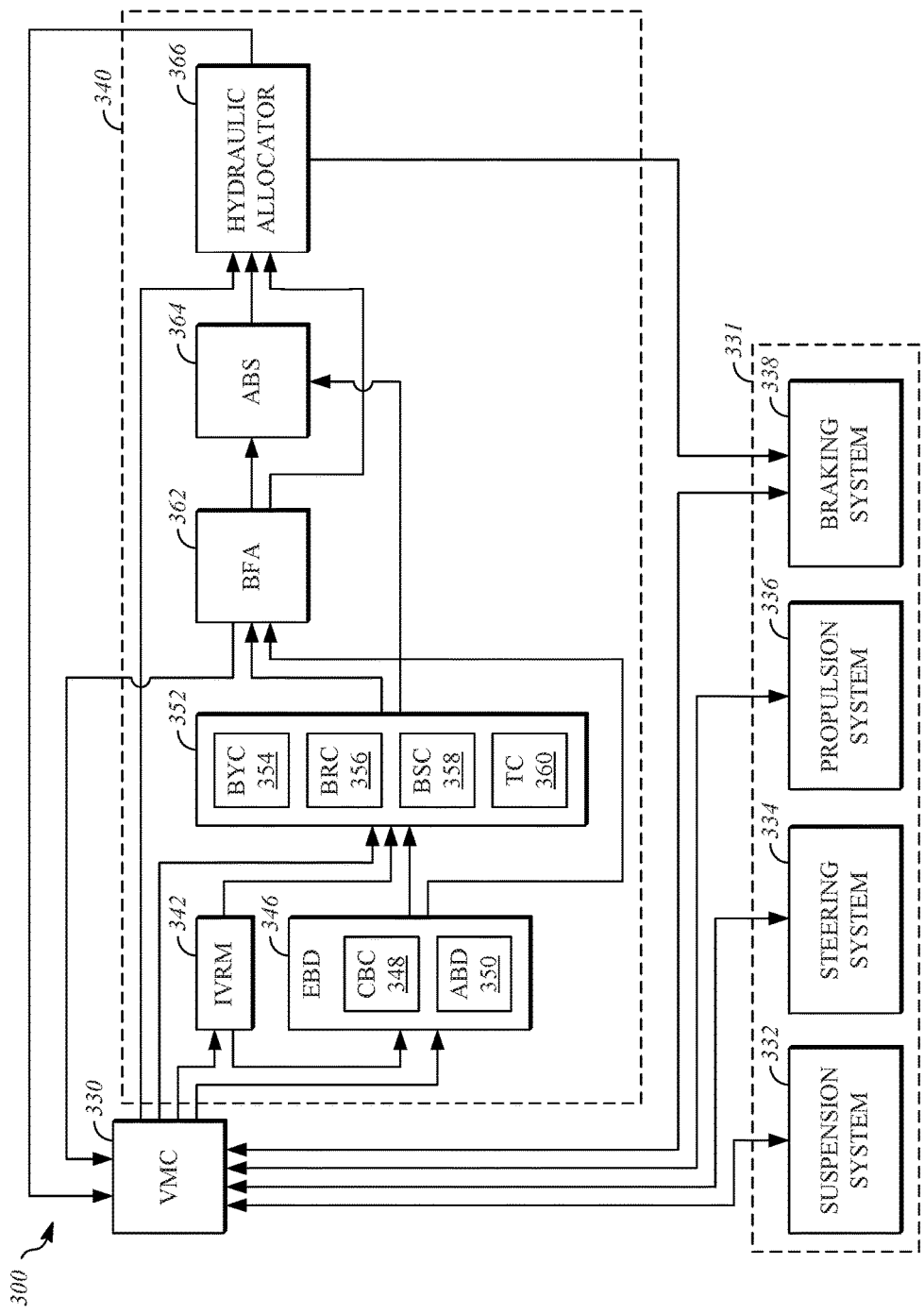
FIG. 3 is an illustration showing an integrated control system.

FIG. 3 shows an integrated control system 300 that may be implemented in the vehicle 100. The modules and functions of the integrated control system 300 may be implemented using one or more controllers that each include a memory and a processor that is operable to execute instructions that are stored in the memory, such as the electronic control unit 114. The integrated control system 300 includes a vehicle motion control system 330, actuator control systems 331, and a stability control system 340.

The vehicle motion control system 330 is responsible for determining the desired path 222 for the vehicle 100, receiving information from sensors such as the sensors 116, and making decisions. The desired path 222 may be determined, for example, by an advanced driver assistance system, in order to cause the vehicle 100 to follow a desired trajectory and a desired velocity profile.

The desired path 222 may be represented by information in any form that can be created by the vehicle motion control system 330 and communicated to other systems of the vehicle 100. As one example, the desired path 222 may be represented by points in three-dimensional space or two-dimensional space. As another example, the desired path 222 may be represented by a polynomial. The desired states may include desired states for lateral stability, yaw stability, and roll stability, and correspond to the desired path 222, such conformance with the desired states should result in following the desired path 222.

Information received from the sensors may include information representing the roadway on which the vehicle 100 is travelling including objects and obstacles on the roadway. This information may identify roadway and lane boundaries or may be usable to allow identification of roadway and lane boundaries. As an example, this information may describe the geometric features of the roadway and objects near the vehicle 100 in the form of a set of three-dimensional point data obtained by sensors such as cameras, laser scanners, ultrasonic sensors, and radars. As another example, this information may include position information, such as from a GPS receiver, and this information may be utilized in combination with mapping.

The information received from the sensors may also include information regarding a current operating condition of the vehicle 100. As an example, this information may describe side slip angle, friction, and wheel speeds for each of the road wheels 104 of the vehicle 100. In semi-autonomous vehicles, this information may describe the steering wheel angle and rate. As another example, this information may include powertrain state information, such as a throttle position, and front and rear axle torque. As another example, this information may include 3-axis translational accelerations from a sensor such as an accelerometer. As another example, this information may include 3-axis rotational rates from a sensor such as a gyroscope.

Decision making may include, for example, modifying the desired path based on the information received from the sensors. As an example, if an obstacle is detected ahead of the vehicle 100, the vehicle motion control system 330 may modify the desired path 222 in response to detecting the obstacle in order to avoid colliding with the obstacle.

In some implementations, the vehicle motion control system 330 is configured to operate the vehicle 100 in a fully autonomous mode of operation. In the fully autonomous mode of operation, the vehicle motion control system 330 generates outputs that cause operation of the actuator control system 331 such that the vehicle 100 follows the desired path 222. The fully autonomous mode of operation may be the only mode of operation for the vehicle 100, or the fully autonomous mode of operation may be engaged and utilized at certain times, such as in response to a request from the user of the vehicle 100.

In some implementations, the vehicle motion control system 330 is configured to operate the vehicle 100 in a semi-autonomous mode of operation. In the semi-autonomous mode of operation, the vehicle motion control system 330 generates outputs to the actuator control system 331 that are based at least in part on control inputs from a human driver, made using control devices such as a steering wheel and pedals. Upon detecting certain conditions, the vehicle motion control system 330 may intervene and cause operation of the vehicle 100 in a manner that differs from the control inputs from the human driver, such as by changing the direction of the vehicle 100 to avoid an obstacle, by changing the direction of the vehicle 100 to prevent lane departure, or changing the speed of the vehicle 100 by braking or accelerating to avoid an obstacle.

The actuator control system 331 incorporates systems that directly modify the dynamic state of the vehicle 100. The components of the actuator control system 331 may be controlled by commands received from the vehicle motion control system 330 and/or the stability control system 340. In the illustrated example, the actuator control system 331 includes a suspension system 332, a steering system 334, a propulsion system 336, and a braking system 338.

The suspension system 332 is operable to exercise control over, coordinate operation of, and receive information from the suspension components 106. The suspension system 332 may responds to and execute commands received from the vehicle motion control system 330. The suspension system 332 may also transmit information to the vehicle motion control system 330, such as information received from sensors.

The steering system 334 is operable to exercise control over, coordinate operation of, and receive information from the steering components 108. The steering system 334 may responds to and execute commands received from the vehicle motion control system 330. The steering system 334 may also transmit information to the vehicle motion control system 330, such as information received from sensors.

The propulsion system 336 is operable to exercise control over, coordinate operation of, and receive information from the propulsion components 112. The propulsion system 336 may responds to and execute commands received from the vehicle motion control system 330. The propulsion system 336 may also transmit information to the vehicle motion control system 330, such as information received from sensors.

The braking system 338 is operable to exercise control over, coordinate operation of, and receive information from the braking components 110. The braking system 338 may responds to and execute commands received from the vehicle motion control system 330. The braking system 338 may also transmit information to the vehicle motion control system 330, such as information received from sensors. The braking system 338 may also receive commands from the stability control system 340.

The braking system 338 is able to execute braking requests from the vehicle motion control system 330, such as a request for a specific braking pressure for a particular wheel of the road wheels 104 or a request for a specific pressure at the brake boost module. External requests may be at a body control level, such as a request that specifies an acceleration profile to be achieved by the braking system 338. External requests may also be at an actuator level, such as a request to the braking system 338 for a specific braking pressure for a particular wheel of the road wheels 104, or a request to the braking system 338 for a specific pressure at the master cylinder.

The braking system 338 typically services requests from the vehicle motion control system 330. In response to commands from the stability control system 340, however, the braking system 338 allows the stability control system 340 to intervene by servicing the commands from the stability control system 340 instead of or in addition to the external requests. For example, the stability control system 340 may intervene by causing the braking system 338 to cause braking to be applied by the braking components 110 in a manner that limits longitudinal wheel slip to a target amount. As will be explained herein, intervention by the stability control system 340 may occur as a response to deviations between the desired path 222, the reference path 224, and the measured path 226, and the purpose of the intervention is to return the vehicle 100 to a stable condition if it is currently unstable, so the vehicle 100 is able to subsequently return to following the desired path 222.

In one implementation, the braking system 338 executes commands that are received from the vehicle motion control system 330 unless the stability control system 340 intervenes, such as by sending a command to the braking system 338. Upon intervention by the stability control system 340, the braking system 338 may execute commands received from the stability control system 340 instead of executing commands from the vehicle motion control system 330. In other implementations, the braking system 338 may be configured to prioritize and service commands from the vehicle motion control system 330 and the stability control system 340 in a different manner, such as by applying a set of rules to determine how to respond to conflicting commands.

The stability control system 340 is operable to identify and reduce an unstable condition of the vehicle 100, while also controlling the vehicle 100 in a manner that is consistent with following the desired path 222. An unstable condition is defined as a condition in which the measured operating states of the vehicle 100 do not match expected states, which are referred to herein as reference states. The measured operating states correspond to the instantaneous measured vehicle states, such as the lateral acceleration and vehicle yaw-rate, which can result under the assumption of steady state to the measured path 226; the reference states result to the reference path 224. To determine the reference states, the stability control system 340 includes an internal vehicle reference model (IVRM) 342 that receives as inputs the measured vehicle states, as well as estimated quantities, such as road friction coefficient. When an unstable condition is detected, the stability control system 340 intervenes to return controllability to the vehicle 100. The stability control system 340 is also operable to compare the reference states of the vehicle 100 with desired states that correspond to the desired path 222 determined from the vehicle motion control system 330, and cause correction of the operation of the vehicle 100 to conform the reference states to the desired states. Thus, when the vehicle 100 is in an unstable condition, modifications are first made to regain controllability, and further modifications may be made to cause the vehicle 100 to follow the desired path 222.

The internal vehicle reference model 342 receives inputs from the vehicle motion control system 330 regarding the current operating characteristics of the systems of the vehicle 100. The internal vehicle reference model 342 may receive information describing acceleration and angular rates in x, y, and z directions for the vehicle 100 as inputs. The internal vehicle reference model 342 may also receive information describing side slip estimates, longitudinal slip estimates, and road friction estimates for the vehicle 100 from the vehicle motion control system 330.

The reference states are estimated by the internal vehicle reference model 342 using the inputs describing current operating states of the vehicle 100 received from the vehicle motion control system 330. The reference states represent an expected vehicle response for the vehicle 100. The expected vehicle response describes expected motion of the vehicle 100 in response to execution of commands, such as braking commands received from the vehicle motion control system 330. Thus, the reference states describe how the vehicle 100 should handle under current operating conditions. The current operating conditions can be measured by sensors, estimated, or assumed for the purpose of determining the reference states. For example, a friction coefficient can be estimated or assumed for the purpose of determining the reference states.

In one implementation, the internal vehicle reference model 342 is a simple passive vehicle model characterized from physical testing, such as a single track vehicle dynamics model. As an example, the internal vehicle reference model may be a set of functions that are calibrated based on the physical characteristics of the vehicle 100 to generate outputs that represent expected future operating characteristics of the vehicle 100 in response to inputs that represent current operating characteristics of the vehicle 100. It should be understood, however, that more complex models can be adopted for use as the internal vehicle reference model 342, in order to provide a more accurate representation of the reference states.

The internal vehicle reference model 342 facilitates fundamental chassis control, such as controlling operating characteristics of an active or semi-active suspension, or by controlling operating characteristics of the powertrain of the vehicle 100.

The references states provided by the internal vehicle reference model 342 may include 3-axis body and translational, e.g. lateral acceleration reference state, rotational rates, e.g. yaw reference state, and a roll reference state, to represent the manner in which the vehicle 100 is expected to operate given current operating conditions and commands. Other values may be estimated by the internal vehicle reference model 342 and included in the reference state values, such as individual wheel longitudinal slip reference states.

The stability control system 340 includes an electronic brake distribution module (EBD) 346 that is operable to distribute braking torque between the road wheels 104 of the vehicle 100 by controlling the braking pressure applied by the braking components 110 associated with each of the road wheels 104. The electronic brake distribution module 346 includes a corner brake control module (CBC) 348. The corner brake control module 348 is operable to distribute braking torque between the road wheels 104 on the left and right side of the vehicle 100. As an example, the corner brake control module 348 may be operable to distribute braking torque during cornering to the road wheels 104 that have the highest load. The electronic brake distribution module 346 also includes an axle brake distribution module (ABD) 350 that is operable to distribute braking torque between the front and rear axles of the vehicle 100.

As inputs, the electronic brake distribution module 346 may receive wheel speeds for all four road wheels 104, and current operating conditions describing the actuator control systems 331 from the vehicle motion control system 330. The electronic brake distribution module may also receive the reference states from the internal vehicle reference model 342. As outputs, the electronic brake distribution module 346 may provide boundary limits describing acceptable ranges of wheel force limits determining the available brake torque for the braking components 110 associated with each of the road wheels 104.

The stability control system 340 includes a stability determining module 352. The stability determining module 352 includes a body yaw control module 354, a body roll control module 356, a body sideslip control module 358, and a traction control module 360.

The stability determining module 352 receives inputs from the vehicle motion control system 330, the internal vehicle reference model 342, and the electronic brake distribution module 346. The inputs received form the vehicle motion control system 330 may include the desired states, such as a desired roll angle, a desired yaw raw, and a desired side slip. Other inputs received from the vehicle motion control system 330 may include current states for the individual components of the actuator control system 331, and measured, estimated or commanded values describing vehicle acceleration in x, y, and z directions, angular rates in x, y, and z directions, longitudinal wheel speed, normal force, road friction, side slip, and longitudinal vehicle speed. The stability determining module 352 receives information describing the reference states from the internal vehicle reference model 342. The stability determining module 352 may also receive information describing the acceptable ranges of brake torque distribution for the braking components 110 from the electronic braking distribution module 346.

The body yaw control module 354 is operable to output a request for a particular yaw moment. The body yaw control module 354 is also operable to status information that describes a yaw stability control state. As will be described further herein, the yaw stability control state may be based on deviation between a reference yaw stability state and a measured yaw stability state, based on a deviation between the reference yaw stability state and a desired yaw stability state, and based on a difference between the desired yaw stability state and the measured yaw stability state.

The body roll control module 356 is operable to output a request for a particular roll moment. The body roll control module 356 is also operable to status information that describes a roll stability control state. As will be described further herein, the roll stability control state may be based on deviation between a reference roll stability state and a measured roll stability state, based on a deviation between the reference roll stability state and a desired roll stability state, and based on a difference between the desired roll stability state and the measured roll stability state.

The body sideslip control module 358 is operable to output a request for a particular body force to limit the body sideslip angle of the vehicle 100, which can be accomplished by adjusting brake torques individually for each of the road wheels 104 or by adjusting propulsion torques individually for each of the road wheels. The body sideslip control module 358 is also operable to status information that describes a lateral stability control state. As will be described further herein, the lateral stability control state may be based on deviation between a reference lateral stability state and a measured lateral stability state, based on a deviation between the reference lateral stability state and a desired lateral stability state, and based on a difference between the desired lateral stability state and the measured lateral stability state.

The traction control module 360 is operable to output a request for a traction control intervention to cause adjustment operation of the propulsion system 336. For example, the traction control module 360 may compare the estimated longitudinal speed of the vehicle 100 to the wheel speed for each of the road wheels 104, and determine that a traction control intervention is necessary in response to identifying a discrepancy between the estimated longitudinal speed of the vehicle 100 to the wheel speed for one or more of the road wheels 104, which may be indicative of wheel spin. The traction control intervention may include, for example, limiting the propulsion torque applied to one or more of the road wheels 104 until traction is regained.

Stability control functions for lateral stability, yaw stability, and roll stability are controlled by the stability determining module 352 based on the desired state, the reference state, and the measured state for each of the lateral stability, yaw stability, and roll stability of the vehicle 100. The reference states are used to determine whether the vehicle 100 is stable. Stability is assessed by determining a reference deviation based on the reference states and the measured states. Reference deviation is defined as a difference between the measured states and the reference states. If the measured states and reference states match within a threshold amount, the vehicle 100 is considered to be stable. When the measured states and reference states differ by more than the threshold amount, the vehicle 100 is considered to be unstable. In response to determining that the vehicle 100 is unstable based on reference deviation, stability control functions may intervene to restore stability, such as by applying the brakes and/or by issuing external requests to other actuators such as the propulsion system 336, the suspension system 332, and the steering system 334, in order to cause the measured states to change so that they conform to the reference states.

The desired states for lateral, yaw, and roll behavior of the vehicle correspond to following the desired path 222. Thus if the vehicle 100 is operated in accordance with the desired states and is stable with respect to the reference states, the expected result is that the vehicle 100 will follow the desired path 222. A deviation between the desired path 222 and the reference path 224 and/or a deviation between the desired path 222 and the measured path 226 does not mean loss of stability; such a deviation suggests that the vehicle motion control system 330 should modify operation of the actuator control system 331 so as to bring the vehicle to the desired path.

For each of lateral stability, yaw stability, and roll stability, stability control states can be identified by calculating a reference deviation, a desired deviation, and a control deviation. Some of the control states indicate that the vehicle 100 is not stable (deviates between desired and reference) or is not following the path (deviates between desired and measured), and therefore trigger modification of the operation of the actuator control system 331.

Desired deviation is defined as a difference between the measured state and the desired state. The desired deviation may be compared to a desired threshold to determine whether the vehicle 100 is following the desired path 222. If the desired deviation is less than the desired threshold, the vehicle 100 it is determined that the vehicle 100 is following the desired path 222. If the desired deviation is greater than the desired threshold, it is determined that the vehicle 100 is not following the desired path 222.

The desired states may differ from the reference vehicle response. Such a deviation is referred to as control deviation, and indicates that the manner in which the vehicle 100 is currently being controlled is not consistent with the desired states and may cause the vehicle 100 to deviate from the desired states as opposed to causing the vehicle 100 to achieve the desired states. Control deviation is defined as a difference between the desired path 222 and the reference path 224. The control deviation may be compared to a control threshold to determine a control deviation state based on the whether the following the reference path 224 will result in the vehicle 100 following the desired path 222. If the control deviation is less than the control threshold, it is determined that following the reference path will cause the vehicle 100 to follow the desired path 222. If the control deviation is greater than the control threshold, it is determined that following the reference path will not cause the vehicle 100 to follow the desired path 222. In such case, the vehicle motion control system 330 will transmit a command to the actuator control system that requests that the actuator control system 331 perform an action to reduce the control deviation.

Stability control functions are implemented in accordance with stability control states. As one example, there may be eight distinct stability control states. In other examples, there may be more than eight distinct stability control states. The current stability control state may be determined based on the reference deviation, the desired deviation, and the control deviation. Each of the stability control states may correspond to a distinct combination of comparison results for reference deviation, the desired deviation, and the control deviation with their respective thresholds.

The stability control states may be evaluated separately for each of lateral stability, yaw stability, and roll stability, separately, or the stability control states may be evaluated for lateral stability, yaw stability, and roll stability together. If the stability control states may be evaluated for lateral stability, yaw stability, and roll stability together, deviation is considered to be greater than the threshold if the individual deviation for any of lateral stability, yaw stability, or roll stability exceeds the respective threshold, and deviation is considered to be less than the threshold if the individual deviations for all of lateral stability, yaw stability, and roll stability are less than the respective thresholds.

In a first stability control state, the reference deviation is less than the reference threshold, the desired deviation is less than the desired threshold, and the control deviation is less than the control threshold. In the first stability control state, the vehicle 100 is stable, is following the desired path 222, and is currently being controlled in a manner that is consistent with following the desired path 222. No intervention by the stability control system 340 is required.

In a second stability control state, the reference deviation is greater than the reference threshold, the desired deviation is less than the desired threshold, and the control deviation is less than the control threshold. In the second stability control state, the vehicle 100 is unstable but is following the desired path 222, and is currently being controlled in a manner that is consistent with following the desired path 222. In response to identifying the second stability control state as the current stability control state for the vehicle 100, the braking control module may intervene by applying braking at one or more of the wheels to regain stability.

In a third stability control state, the reference deviation is greater than the reference threshold, the desired deviation is greater than the desired threshold, and the control deviation is less than the control threshold. In the third stability control state, the vehicle 100 is unstable and is not following the desired path 222, but the control deviation indicates that the manner in which the vehicle 100 is currently being controlled is consistent with following the desired path 222. In response to identifying the third stability control state as the current stability control state for the vehicle 100, the braking control module may intervene by applying braking at one or more of the wheels to regain stability. Subsequent to regaining stability, the vehicle motion control system 330 may modify operation of the actuator control system 331 to reduce the desired deviation and cause the vehicle 100 return to following the desired path 222.

In a fourth stability control state, the reference deviation is greater than the reference threshold, the desired deviation is less than the desired threshold, and the control deviation is greater than the control threshold. In the fourth stability control state, the vehicle 100 is unstable. Although the vehicle 100 is following the desired path 222, the control deviation indicates that the manner in which the vehicle 100 is currently being controlled may cause the vehicle 100 deviate from the desired path 222. In response to identifying the fourth stability control state as the current stability control state for the vehicle 100, the braking control module may intervene by applying braking at one or more of the wheels to regain stability. Subsequent to regaining stability, the vehicle motion control system 330 may modify operation of the actuator control system 331 to reduce the control deviation to prevent the vehicle 100 from leaving the desired path 222.

In a fifth stability control state, the reference deviation is greater than the reference threshold, the desired deviation is greater than the desired threshold, and the control deviation is greater than the control threshold. In the fifth stability control state, the vehicle 100 is unstable, the vehicle 100 is not following the desired path 222, and that the manner in which the vehicle 100 is currently being controlled may cause the vehicle 100 deviate further from the desired path 222. In response to identifying the fifth stability control state as the current stability control state for the vehicle 100, the braking control module may intervene by applying braking at one or more of the wheels to regain stability. Subsequent to regaining stability, the vehicle motion control system 330 may modify operation of the actuator control system 331 to reduce the control deviation and the desired deviation to return the vehicle 100 to following the desired path 222.

In a sixth stability control state, the reference deviation is less than the reference threshold, the desired deviation is greater than the desired threshold, and the control deviation is less than the control threshold. In the sixth stability control state, the vehicle 100 is stable. The vehicle 100 is not following the desired path 222, but that the manner in which the vehicle 100 is currently being controlled is consistent with following the desired path 222. In response to identifying the sixth stability control state as the current stability control state for the vehicle 100, the vehicle motion control system 330 may modify operation of the actuator control system 331 to reduce the desired deviation to return the vehicle 100 to following the desired path 222. The braking control module does not intervene, but instead services external requests for braking, such as requests from the vehicle motion control system 330.

In a seventh stability control state, the reference deviation is less than the reference threshold, the desired deviation is greater than the desired threshold, and the control deviation is greater than the control threshold. In the seventh stability control state, the vehicle 100 is stable. The vehicle 100 is not following the desired path 222, and that the manner in which the vehicle 100 is currently being controlled may cause the vehicle 100 deviate further from the desired path 222. In response to identifying the seventh stability control state as the current stability control state for the vehicle 100, the vehicle motion control system 330 may modify operation of the actuator control system 331 to reduce the control deviation and the desired deviation to return the vehicle 100 to following the desired path 222. The braking control module does not intervene, but instead services external requests for braking, such as requests from the vehicle motion control system 330.

In an eighth stability control state, the reference deviation is less than the reference threshold, the desired deviation is less than the desired threshold, and the control deviation is greater than the control threshold. In the eighth stability control state, the vehicle 100 is stable and is following the desired path 222. However, the manner in which the vehicle 100 is currently being controlled may cause the vehicle 100 deviate from the desired path 222. In response to identifying the eighth stability control state as the current stability control state for the vehicle 100, the vehicle motion control system 330 may modify operation of the actuator control system 331 to reduce the control deviation to prevent the vehicle 100 from departing from the desired path 222. The braking control module does not intervene, but instead services external requests for braking, such as requests from the vehicle motion control system 330.

The stability control system 340 includes a brake force allocator (BFA) 362. The brake force allocator 362 will allocate actuator effort by outputting actuation commands to efficiently stabilize the vehicle. When necessary, the brake force allocator 362 can output actuation commands to utilize all available actuators from the actuator control system 331 in order to achieve a desired braking force or rotation. In the illustrated implementation, some of the actuation commands are intended to modify operation of the propulsion system 336, the steering system 334 and the suspension system 332, and these actuation commands are transmitted to the vehicle motion control system 330. Actuation commands that are intended to modify operation of the braking components 110 (e.g. friction brakes) are transmitted directly to the braking system 338.

The brake force allocator 362 is operable to output a braking command that indicates a desired braking torque for each of the road wheels 104. The desired braking torques for the road wheels 104 are determined based on the stability control states in order to restore stability to the vehicle 100 by reducing the reference deviation. The desired braking torques for the road wheels 104 may also be determined based on the stability control states to cause the vehicle 100 to follow the desired path 222, by reducing the control deviation and the desired deviation. As inputs, the brake force allocator 362 receives requests and status information from the stability determining module 352. The brake force allocator 362 also receives the brake torque distribution boundary limits from the electronic brake distribution module 346, which may be used to constrain the desired braking torques indicated by the braking command in order to avoid causing instability of the vehicle 100. Based on the stability control states, the brake force allocator 362 is further able to determine and request adjustments to the suspension system 332, the steering system 334, and the propulsion system 336, in order to reduce the reference deviation, the control deviation, and/or the desired deviation. These requested adjustments may be transmitted to the vehicle motion control system 330.

As an example, the stability determining module 352 identifies a reference deviation that indicates that the vehicle 100 is unstable, and transmits a request to the brake force allocator that specifies a yaw moment to be applied in order to counter the instability of the vehicle 100. The brake force allocator 362 determines braking torques for the road wheels 104 that will achieve the desired yaw moment. These braking torques are compared to the brake torque distribution boundary limits. If the determined braking torques are within the brake torque distribution boundary limits, the brake force allocator 362 transmits a request to cause the braking system 338 to apply braking based on the determined braking torques. If the determined braking torques are not within the brake torque distribution boundary limits, the brake force allocator 362 transmits a first request to cause the braking system 338 to apply a first yaw moment by braking based on the determined braking torques as limited by the brake torque distribution boundary limits, and transmits a second request to the vehicle motion control system 330 to apply a second yaw moment. The vehicle motion control system 330 causes the second yaw moment to be applied another actuator system, such as one or more of the suspension system 332, the steering system 334, and the propulsion system 336. The first yaw moment and the second yaw moment, combined, are equivalent to the desired yaw moment. While this example contemplates achieving a particular yaw moment, this type of control can be applied to achieve other desired states.

The stability control system 340 includes an antilock braking system (ABS) 364. The antilock braking system 364 receives the desired braking torques from the brake force allocator and adapts the braking command going to a hydraulic allocator 366. The antilock braking system 364 through hydraulic allocator will try to prevent the wheels from locking up during braking, targeting to minimize braking distance while maintaining steer ability. The hydraulic allocator 366 is operable to cause application of braking torque by the braking system 338, such as by applying specific hydraulic pressures to the braking components 110. The hydraulic allocator translates brake pressure requests to hydraulic pressure per wheel compensating for temperature, pressure and/or volume consumption. The final low level control of the valves in the braking system 338 modulates the inlet, release and shuttle-return valves and the hydraulic actuator (rotary pump or linear actuator or any type) as in any traditional ABS system so as to achieve the demanded brake pressure from the hydraulic allocator 366. The antilock braking system 364 may facilitate a wheel lockup. For example, the antilock braking system 364 may cause wheel lockup of one or more of the road wheels 104 when the body roll control module 356 requests a wheel lock up to mitigate roll over, or wheel lock at packed snow driving conditions.

Figure 4:
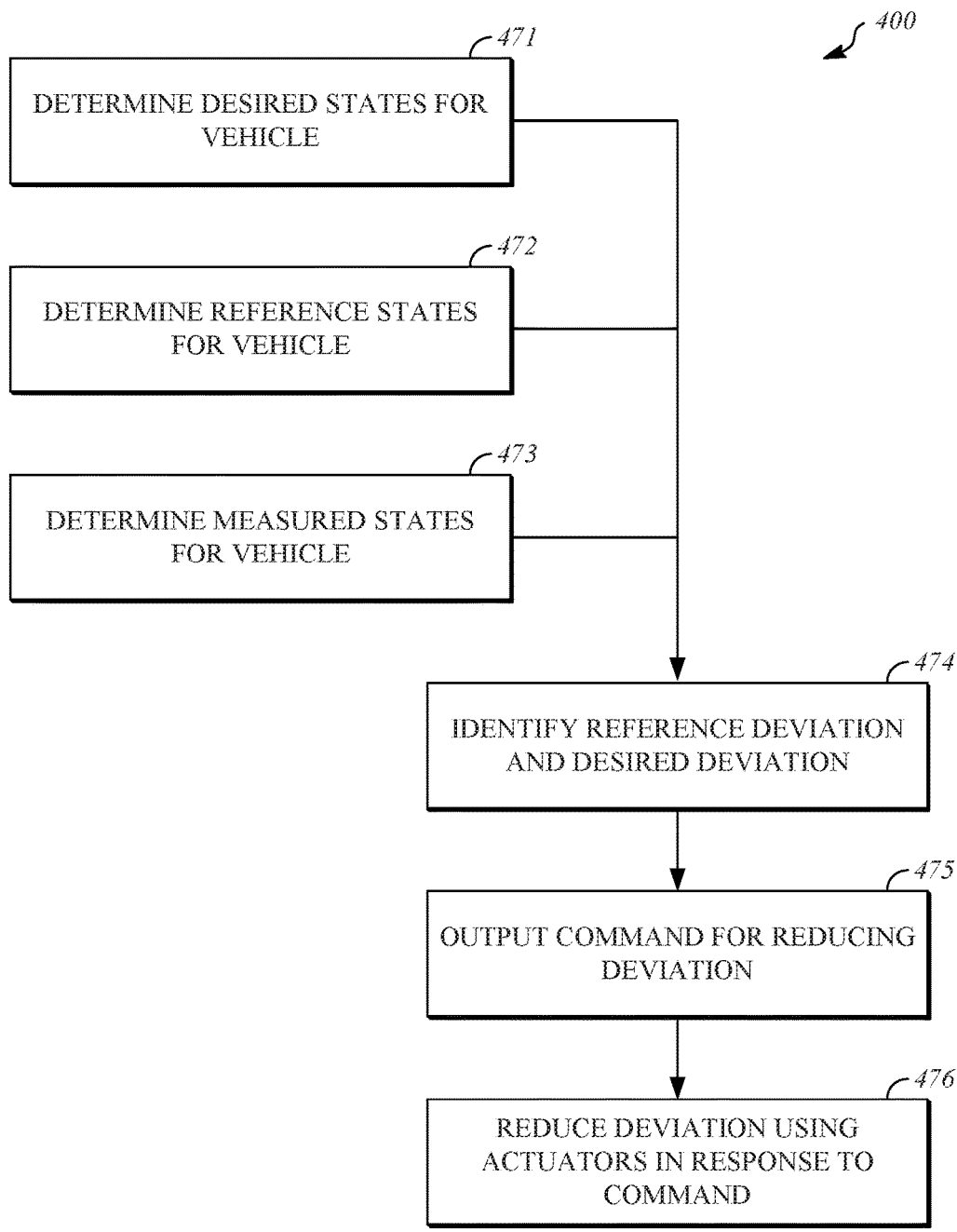
FIG. 4 is a flowchart showing a stability control process according to a first example.

FIG. 4 shows a stability control process 400 according to a first example that may be implemented using the integrated control system 300. Operation 471 includes determining desired states for the vehicle 100. Operation 471 may be performed, for example, by the vehicle motion control system 330 by determining desired states for the vehicle 100 based on a vehicle trajectory and a vehicle velocity profile. Operation 472 includes determining reference states for the vehicle 100 that represent an expected vehicle response. Operation 472 may be performed, for example, in the manner described with respect to the internal vehicle reference model 342. Operation 473 includes determining measures states for the vehicle 100. Operation 473 may be performed, for example, by the sensors 116 transmitting information to the electronic control unit 114 for use by the integrated control system 300.

Operation 474 includes identifying a reference deviation between the reference states and the measured states, and identifying a desired deviation between the desired states and the measured states. Operation 475 includes outputting a command for reducing the reference deviation and/or the desired deviation. Thus, operation 475 may include reducing the reference deviation in a manner that also reduces the desired deviation. For example, at operation 475, when the reference deviation between the reference states and the measured states exceeds the reference threshold, a command is output for transitioning the vehicle 100 from the unstable condition to a stable condition and for reducing the reference deviation. Operations 474 and 475 may be performed, for example, by the stability determining module 352 in the manner previously described. Operation 476 includes reducing the reference deviation using actuators, such as the actuator control system 331 in response to the command that was output in operation 475, to transition the vehicle 100 to stable operation and to reduce the desired deviation.

Figure 5:
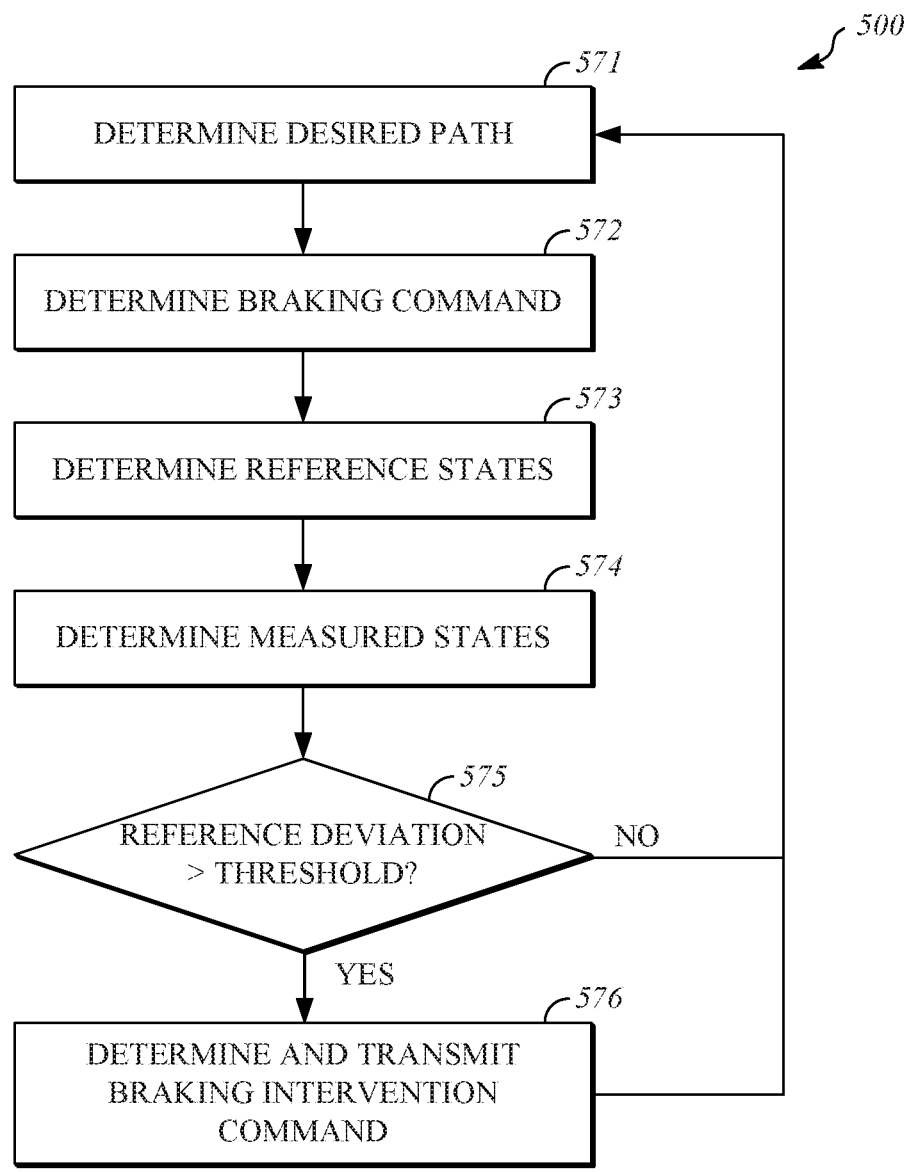
FIG. 5 is a flowchart showing a stability control process according to a second example.

FIG. 5 shows a stability control process 500 according to a second example that may be implemented using the integrated control system 300. Operation 571 includes determining a desired path for the vehicle 100. Operation 572 includes determining a braking command based on the desired path. Operations 571 and 572 can be performed in accordance with the description of the vehicle motion control system 330. Information describing braking command can be transmitted to the stability control system 340. The braking command can be concurrently transmitted to the braking system 338 to apply braking in accordance with the braking command.

In operation 573, reference states are determined based on the braking command. The reference states represent expected vehicle performance in response to execution of the braking command. In operation 574, measured states for the vehicle 100 are determined. The reference states are compared to the measured states, and the difference between these values is the reference deviation. If, in operation 575, the reference deviation is greater than a reference threshold, which describes a maximum permissible value for the reference deviation, it is determined that the vehicle 100 is unstable. In operation 576 a braking intervention command is determined based on the reference deviation by applying braking to reduce the magnitude of the reference deviation. The braking intervention command is transmitted to the braking system 338, where the braking intervention command is utilized to control the braking system 338 instead of the braking commands issued by the vehicle motion control system. This intervention continues until stability is restored.

Figure 6:
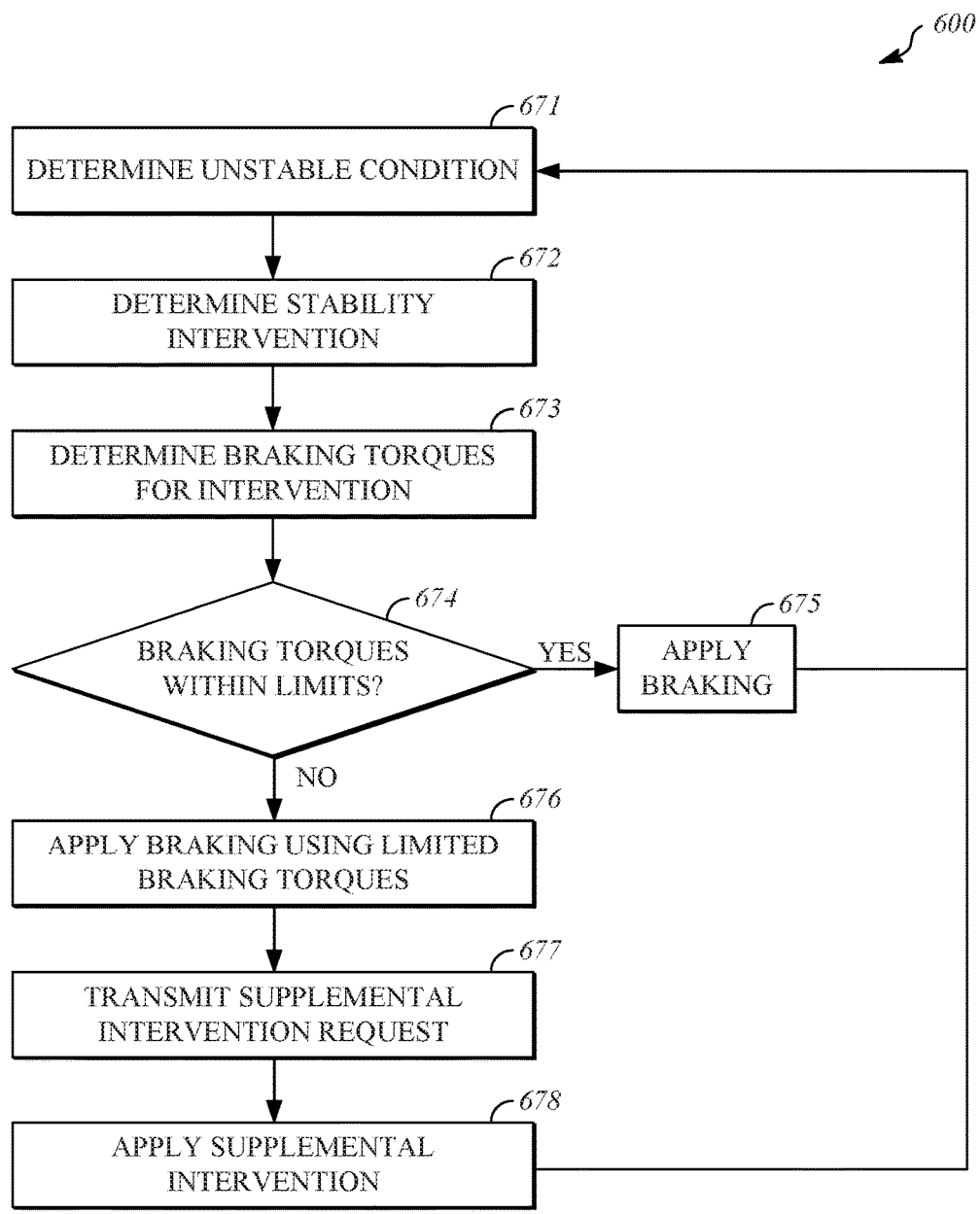
FIG. 6 is a flowchart showing a stability control process according to a third example.

FIG. 6 shows a stability control process 600 according to a third example that may be implemented using the integrated control system 300. Operation 671 includes identifying an unstable condition for the vehicle 100, for example, when the reference deviation is greater than the reference threshold. Operation 672 includes determining a stability intervention having a magnitude based on the difference between one or more of the desired states and one or more of the reference states, wherein the intervention is intended to reduce the reference deviation. The intervention can be, as examples, a yaw rate correction that reduces a difference between a reference yaw rate and a desired yaw rate, or a roll rate correction that reduces a difference between a reference roll rate and a desired roll rate.

Operation 673 includes determining braking torques for the road wheels 104 that will achieve the desired magnitude for the intervention. In operation 674, the determined braking torques are compared to a maximum brake torque value, such as brake torque distribution boundary limits. If the determined braking torques are within the brake torque distribution boundary limits, braking is applied, at operation 675, by transmitting a braking intervention command in accordance with the determined braking torques from operation 673.

If the determined braking torques are not within the brake torque distribution boundary limits, the magnitude of the intervention is apportioned to the braking system 338 and other actuator systems by determining a braking intervention component and a supplemental intervention component that, together, are equivalent to the desired magnitude for the intervention. In operation 676, limited braking torques are determined to service the braking component and are applied by transmitting a command to the braking system 338. The limited braking torques are determined by limiting the magnitude of the braking torques such that they do not exceed the brake torque distribution limits. In operation 677, a supplemental intervention request is transmitted to the vehicle motion control system, representing the portion of the intervention magnitude that is not serviced by the braking command. In operation 678, the vehicle motion control system 330 determines and transmits the supplemental intervention command to another actuator system, such as one or more of the suspension system 332, the steering system 334, and the propulsion system 336, in order to restore stability.

What is claimed is:

1. A control system for a vehicle, comprising:
   actuator systems that are operable to cause motion of the vehicle;
   sensors that determine measured states for the vehicle;
   a vehicle motion control system that determines a vehicle trajectory and a vehicle velocity profile, determines desired states for the vehicle based on the vehicle trajectory and the vehicle velocity profile, wherein the desired states correspond to following the vehicle trajectory and the vehicle velocity profile in an autonomous control mode, and generates control outputs for causing operation of the actuator systems according to the desired states;
   a stability control system that:
      determines reference states for the vehicle using an internal vehicle reference model, wherein the reference states for the vehicle represent an expected vehicle response to the control outputs,
      determines that a reference deviation between the reference states and the measured states is greater than a reference deviation threshold,
      determines that a desired deviation between the desired states and the measured states is greater than a desired deviation threshold, and
      outputs stability control commands to the actuator systems for reducing the reference deviation and the desired deviation.

2. The control system of claim 1, wherein the reference states include a reference lateral stability state, the desired states include a desired lateral stability state, and the measured states include a measured lateral stability state.

3. The control system of claim 1, wherein the reference states include a reference yaw stability state, the desired states include a desired yaw stability state, and the measured states include a measured yaw stability state.

4. The control system of claim 1, wherein the reference states include a reference roll stability state, the desired states include a desired roll stability state, and the measured states include a measured roll stability state.

5. The control system of claim 1, wherein the internal vehicle reference model calculates the reference states using a single track vehicle dynamics model.

6. The control system of claim 1, wherein the internal vehicle reference model includes a set of functions that are calibrated based on physical characteristics of the vehicle to generate the reference states based on inputs that represent current operating characteristics of the vehicle.

7. The control system of claim 1, wherein the stability control commands include a first command that is output to the actuator systems for reducing the reference deviation and a second command that is output to the actuator systems for reducing the desired deviation, wherein the second command is output subsequent to a determination, by the stability control system, that the reference deviation has been reduced such that the reference deviation is less than the reference deviation threshold.

8. A control system for a vehicle, comprising:
a vehicle motion control system that determines a desired path for the vehicle and outputs a braking command based on the desired path;
a stability control system that is operable to:
determine reference states that represent an expected future vehicle response to execution of the braking command,
determine, subsequent to execution of the braking command, measured states that represent an actual vehicle response to execution of the braking command,
determine a reference deviation based on a difference between the reference states and the measured states, and
output a braking intervention command for applying braking to reduce the reference deviation; and
a braking system that applies braking in response to the braking command and the braking intervention command.

9. The control system of claim 8, wherein the stability control system determines the reference states using an internal vehicle reference model.

10. The control system of claim 9, wherein the internal vehicle reference model calculates the reference states using a single track vehicle dynamics model.

11. The stability control system of claim 9, wherein the internal vehicle reference model includes a set of functions that are calibrated based on physical characteristics of the vehicle to generate the reference states based on inputs that represent current operating characteristics of the vehicle.

12. The control system of claim 8, wherein the reference states include a reference lateral stability state and the measured states include a measured lateral stability state.

13. The control system of claim 8, wherein the reference states include a reference yaw stability state and the measured states include a measured yaw stability state.

14. The control system of claim 8, wherein the reference states include a reference roll stability state and the measured states include a measured roll stability state.

15. The control system of claim 8, wherein the desired path includes a desired trajectory and a desired velocity profile.

16. A control system for a vehicle, comprising:
a stability control system that is operable to:
determine reference states that represent an expected vehicle response,
determine measured states that represent an actual vehicle response,
identify an unstable condition based on a difference between the reference states and the measured states,
determine a stability intervention to reduce the difference between the reference states and the measured states,
in response to a determination that a brake torque required for the stability intervention is greater than a maximum brake torque value, determine a first component of the stability intervention and a second component of the stability intervention,
output a braking intervention command to satisfy the first component of the stability intervention, and
output a supplemental intervention command to satisfy the second component of the stability intervention;
a braking system that applies braking in response to the braking intervention command; and
a vehicle motion control system that causes operation of an additional actuator system to reduce the difference between the reference states and the measured states in response to the supplemental intervention command from the stability control system.

17. The control system of claim 16, wherein the first component of the stability intervention includes braking torques that are limited by the maximum brake torque value.

18. The control system of claim 17, wherein the stability intervention has a magnitude determined to decrease the difference between the reference states and the measured states, and the first component and the second component, when combined, are equivalent to the stability intervention.

19. The control system of claim 16, wherein the additional actuator system is at least one of a suspension system, a steering system, or a propulsion system.

20. The control system of claim 16, wherein the stability intervention is at least one of a yaw rate correction or a roll rate correction.

* * * * *